US008959766B2

(12) United States Patent
Storch et al.

(10) Patent No.: US 8,959,766 B2
(45) Date of Patent: Feb. 24, 2015

(54) METHOD FOR MACHINING THE ROTOR OF A TURBINE AND DEVICE USEFUL FOR CARRYING OUT THE METHOD

(75) Inventors: Wilfried Storch, Berlin (DE); Stephan Fiedler, Berlin (DE); Björn Heucke, Berlin (DE); Michael Schwaar, Hartmannsdorf (DE); Thomas Jaehnert, Chemnitz (DE); Günter Gnirss, Weinheim (DE)

(73) Assignee: Alstom Technology Ltd, Baden (CH)

( * ) Notice: Subject to any disclaimer, the term of this patent is extended or adjusted under 35 U.S.C. 154(b) by 1108 days.

(21) Appl. No.: 12/720,877

(22) Filed: Mar. 10, 2010

(65) Prior Publication Data

US 2011/0014002 A1     Jan. 20, 2011

(30) Foreign Application Priority Data

Jul. 14, 2009    (DE) .......................... 10 2009 033 234

(51) Int. Cl.
*B23C 3/18*     (2006.01)
*B23P 15/00*     (2006.01)
*B23C 3/34*     (2006.01)

(52) U.S. Cl.
CPC ............... *B23P 15/006* (2013.01); *B23C 3/34* (2013.01); *B23C 2220/366* (2013.01)
USPC ......... 29/889.1; 29/402.06; 29/27 C; 409/132; 409/141; 409/219; 700/160; 700/182; 700/195

(58) Field of Classification Search
USPC ......... 29/889.7, 889.1, 402.06; 409/131, 132, 409/219, 141, 163, 204, 205, 212; 700/159, 700/160, 164, 182, 184, 194, 195, 163, 165, 700/197, 199, 225, 242; 408/23; 82/117, 82/122, 123, 148, 162, 163
See application file for complete search history.

(56) References Cited

U.S. PATENT DOCUMENTS

| 4,149,449 | A | * | 4/1979 | Malinowski et al. ........... 409/84 |
| 4,400,859 | A | * | 8/1983 | Woythal et al. ................ 29/27 C |
| 5,377,116 | A | * | 12/1994 | Wayne et al. .................. 700/175 |

(Continued)

FOREIGN PATENT DOCUMENTS

| DE | 19806608 | 9/1999 |
| DE | 102007055842 | 11/2008 |

(Continued)

OTHER PUBLICATIONS

DE19806608 Translation Document.*

(Continued)

*Primary Examiner* — Alexander P Taousakis
(74) *Attorney, Agent, or Firm* — Buchanan Ingersoll & Rooney PC

(57) ABSTRACT

In a method for machining grooves, especially fir-tree grooves (13), which are provided for accommodating blades (19), on a rotor (10) of a turbine, especially a low-pressure steam turbine, great simplification and high flexibility is achieved by the fact that in the grooves, or fir-tree grooves (13), material is removed by a program-controlled milling device, wherein the milling device is inserted into the groove, or fir-tree groove (13), with a milling tool (20) which is guided along the places in the groove, or fir-tree groove (13), which are to be machined, by a milling tool positioning device, which is freely movable in space.

11 Claims, 4 Drawing Sheets

(56) References Cited

U.S. PATENT DOCUMENTS

| | | | |
|---|---|---|---|
| 5,964,016 A * | 10/1999 | Ito et al. | 29/27 C |
| 6,912,446 B2 * | 6/2005 | Wang et al. | 700/193 |
| 7,007,382 B2 * | 3/2006 | Mantel | 29/889.2 |
| 7,146,725 B2 * | 12/2006 | Kottilingam et al. | 29/889.1 |
| 7,261,500 B2 * | 8/2007 | Killer et al. | 409/132 |
| 7,430,791 B2 * | 10/2008 | Yonemaru | 29/27 C |
| 7,513,027 B2 * | 4/2009 | Boehm et al. | 29/558 |
| 7,690,111 B2 * | 4/2010 | Coffey et al. | 29/889.1 |
| 7,934,315 B2 * | 5/2011 | Milleville | 29/889.1 |
| 7,934,975 B2 * | 5/2011 | Thompson | 451/5 |
| 8,844,117 B2 * | 9/2014 | Prust et al. | 29/558 |
| 2004/0129120 A1 * | 7/2004 | Grossmann | 82/129 |
| 2005/0198821 A1 * | 9/2005 | Reville et al. | 29/889.1 |
| 2006/0048360 A1 * | 3/2006 | Yonemaru | 29/27 C |
| 2006/0137169 A1 * | 6/2006 | Boehm et al. | 29/557 |
| 2009/0182449 A1 * | 7/2009 | Frei et al. | 700/159 |
| 2010/0095526 A1 * | 4/2010 | Derrien et al. | 29/889.1 |
| 2012/0179285 A1 * | 7/2012 | Melzer-Jokisch et al. | 700/164 |

FOREIGN PATENT DOCUMENTS

| | | |
|---|---|---|
| DE | 102008000480 | 9/2009 |
| EP | 1500453 | 1/2005 |
| EP | 2030718 | 3/2009 |
| EP | 2186586 | 5/2010 |
| WO | WO01/96055 | 12/2001 |
| WO | WO03/037562 | 5/2003 |
| WO | WO03/064089 | 8/2003 |
| WO | WO2007/118771 | 10/2007 |

OTHER PUBLICATIONS

Kowall (DE19806608) Translation Document.*
Search Report for German Patent App. No. 102009033234.0 (Sep. 17, 2010).
Search Report from European Patent App. No. 10154190.2 (Oct. 7, 2010).

* cited by examiner

METHOD FOR MACHINING THE ROTOR OF A TURBINE AND DEVICE USEFUL FOR CARRYING OUT THE METHOD

This application claims priority under 35 U.S.C. §119 to German application no. 10 2009 033234.0, filed 14 Jul. 2009, the entirety of which is incorporated by reference herein.

BACKGROUND

1. Field of Endeavor

The present invention relates to the field of turbine technology. It relates, more specifically, to a method for machining grooves, especially fir-tree grooves, which are provided for accommodating blades, on a rotor of a, and also to a device useful for carrying out the method.

2. Brief Description of the Related Art

The fastening of the end blades, which are used on the rotor or rotating component of a low-pressure steam turbine, with fir-tree turbine blade roots, is highly stressed. In FIG. 1, an example of the rotor 10 of a low-pressure steam turbine with an exemplary rotor blade 19 is reproduced. The rotor blade 19 is inserted into one of the curved fir-tree grooves 13 in the rotor disk 11 which extend in the axial direction (axis 12). The curved fir-tree grooves 13, with the teeth 14 which are arranged between these, are reproduced in an enlarged view in FIG. 2. On their flanks, the fir-tree grooves 13 have serrations (15 in FIGS. 3 and 4) which are arranged one above the other, between which lies a serration base in each case (16 in FIGS. 3 and 4). In printed publication DE-A1-10 2007 055 842, as well as in WO-A1-01/96055, for example, a method for producing such fir-tree grooves is disclosed.

Regardless of the turbine running mode, cracks can occur in the fir-tree grooves 13. The crack damage is especially known in fir-tree grooves of the last and second-to-last rotating row on low-pressure turbine rotors of turbine types which are on the market and cannot be avoided in the current design of grooves. The incipient cracks increase further after the incubation phase and, after reaching a specific crack depth, lead to unstable crack growth with the highest possible functional risk for the operational reliability of the rotor. Therefore, incipient cracks in fir-tree grooves of turbine shafts are not acceptable.

The current prevention against component failure exists in cyclic component inspection. In this case, established supercritical crack depths are milled out in order to dissipate the increased stresses in the crack tips with growth potential. The milling out is carried out manually in part with considerable expenditure of time and qualitative uncertainty and carried out exclusively in curved fir-tree grooves with a milling machine of low material-removing capacity which is associated with a guide track of the groove bend. For this, a working platform or equipment platform, which encompasses and/or bridges the component, is especially used, which requires a high equipment and installation cost for carrying out the method.

SUMMARY

One of numerous aspects of the present invention includes making the groove base and the groove flanks, especially of fir-tree grooves, free of cracks, or to keep them free of cracks, by equipment technology which is highly productive and without being limited to the groove track. In particular, a groove base is to be produced which is free of cracks and for this a process technique is to be used which is effective without limitation as a result of the groove contour and groove track of fir-tree grooves which are at risk of incipient cracks, without altering or renewing the groove contour in its configuration according to design.

Another aspect of the present invention includes that in the grooves, or fir-tree grooves, material is removed by a program-controlled milling device, wherein the milling device is inserted into the groove, or fir-tree groove, with a milling tool which is guided along the places in the groove, or fir-tree groove, which are to be machined, by a milling tool positioning device, which is freely movable in space.

One development is characterized in that, as a result of the machining, the shape of the entire groove, or fir-tree groove, is altered in such a way that it is less susceptible to incipient cracks compared with the unaltered shape.

Another development is characterized in that the groove, or fir-tree grooves, are first inspected for the presence of cracks, in that the grooves, or fir-tree grooves, which are flawed with cracks are run over with a probe, in that a milling tool which is matched to the crack shape is selected in each case, in that the depth of the region which is to be cut out for removal of the crack is determined, and in that the region which includes the crack is milled down to the predetermined depth with the selected milling tool in accordance with the scanned groove contour.

For running over the grooves, or fir-tree grooves, which are flawed with cracks, the probe is preferably moved by the milling tool positioning device.

Another development is characterized in that the milling tool is guided along a groove track contour without the shape of the groove, or fir-tree groove, being altered overall.

A further development of the invention is characterized in that the milling tool is driven and/or moved by a drive unit which is arranged outside the groove, or fir-tree groove.

Furthermore, it can be advantageous if, for cutting out the region which includes the crack, a plurality of milling tools with different cutting bodies and/or tool shapes are used one after the other.

It is also conceivable for the milling tool to be moved in the groove, or fir-tree groove, in a plurality of planes in a programmed controllable manner.

Another aspect of methods embodying principles of the present invention includes that the rotor is horizontally mounted on bearings, and that the milling device machines the groove, or fir-tree groove, with a milling tool from the bottom or from the side, wherein the machining forces from the milling process are absorbed by the mass of the rotor without additional component securing. As a result of this, the device engineering cost, which influences the repair process, can be minimized so that the repair process can be carried out as required at the operating site of the turbine itself.

Another aspect includes a device useful for carrying out the methods, which comprises bearings for horizontally supporting the rotor, and a milling device with a milling tool positioned so that the groove, or fir-tree groove, in the rotor can be machined from the bottom or from the side. As a result, a working platform or equipment platform, which encompasses or bridges the rotor, can be advantageously dispensed with.

BRIEF DESCRIPTION OF THE DRAWINGS

The invention shall subsequently be explained in more detail based on exemplary embodiments in conjunction with the drawing. In the drawing.

DETAILED DESCRIPTION OF EXEMPLARY EMBODIMENTS

In general terms, in accordance with principles of the present invention, it is possible to produce a groove base which is free of cracks, wherein a process technique is used which can be used without limitation as a result of the groove contour and groove track of fir-tree grooves at risk of cracking, without the groove contour being altered or renewed in its configuration according to design.

Figure 3:
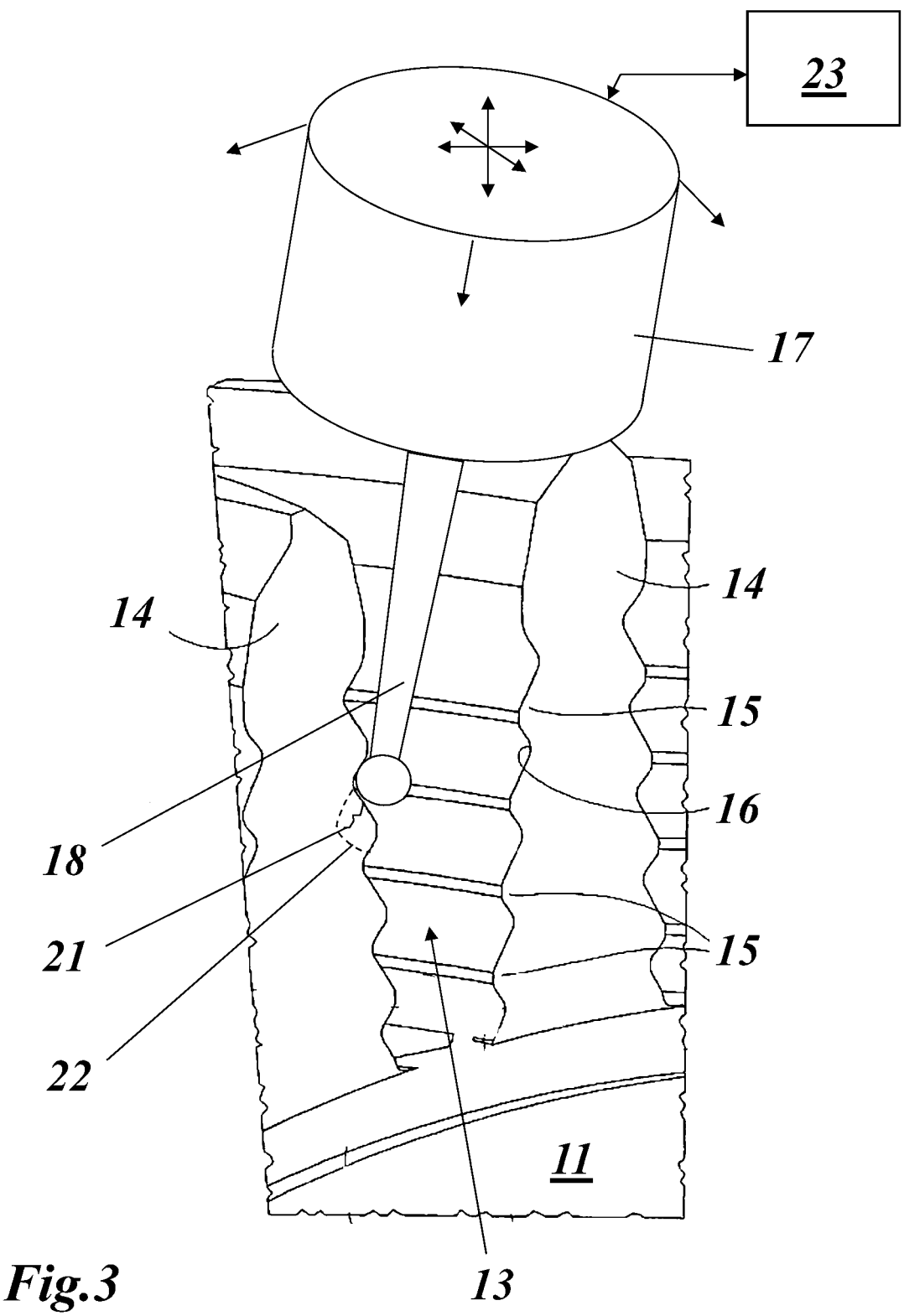
FIG. 3 shows, in a schematic view, the running over of a fir-tree groove, which is flawed with a crack, with a probe which is guided by a milling tool positioning device which is movable in all directions, according to an exemplary embodiment of the invention.
Figure 4:
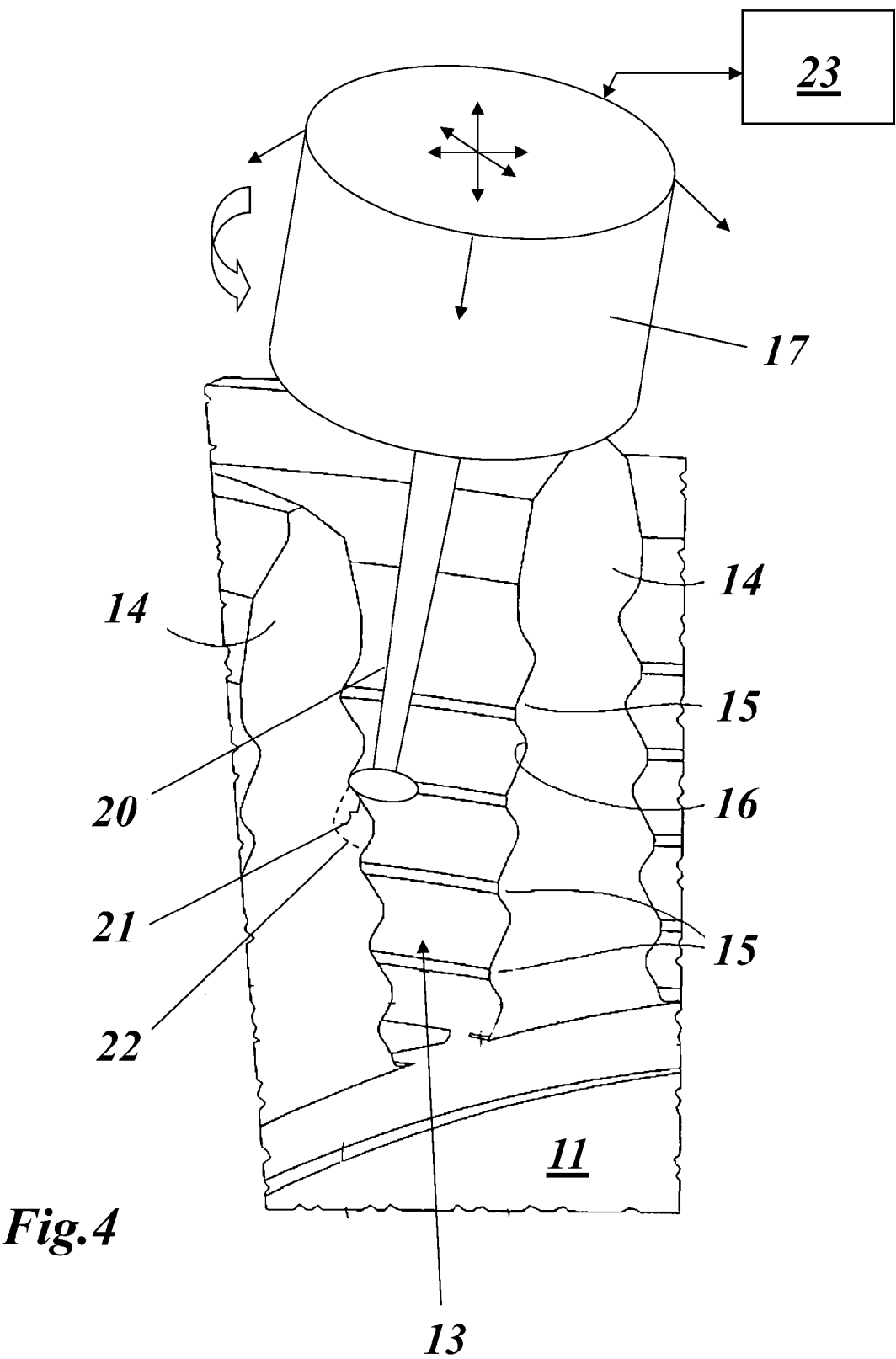
FIG. 4 shows, in a schematic view which is comparable to FIG. 3, the milling out of the region which includes the crack along the previously scanned groove contour.

One solution according to principles of the present invention is determined by a milling process by a milling tool which is dimensionally matched to the groove crack shape, is guided along the crack contour by a tool guide (milling tool positioning device 17 in FIGS. 3 and 4) which is spatially controllable in up to five axes, and the depth setting of which is matched to the crack depth during the milling process and which removes the possible cracks in fir-tree grooves.

The crack-free, new groove base is determined by the current damage state first being determined, i.e., by existing cracks being identified. The milling tool contour is then matched to the type and shape of the cracks. According to FIG. 3, by a probe 18, running over of the groove contour which is flawed with a crack 21 is carried out with a multi-axially controllable milling tool positioning device 17 which can be both moved in the three spatial directions and pivoted in different directions (arrows in FIG. 3) and is in communication with a control unit 23 which controls the movement and stores the scanned groove contour. The groove contour which is recorded by the probe 18 is supplemented by a depth to which the material in the region of the crack 21 has to be removed in order to reliably remove the crack 21 (dashed cutting-out region 22 in FIGS. 3 and 4).

A subsequent exchange of the probe 18 with a milling tool 20 which is dimensionally matched to the crack shape (FIG. 4) and its guiding along the course of the crack enables its spatially freely configurable milling out without alteration to the design-conformal fir-tree groove 13 overall. In this case, a rotating milling body as a tool for the material-removal process of the crack-flawed groove base surface is guided over the crack zone in the groove base of the fir-tree grooves 13 which is to be machined out. For this, the milling tool 20 is guided along the previously programmed fir-tree groove track contour so that this is not affected by the cutting process.

The milling tool 20 is moved in the groove in a plurality of planes in a program-controlled manner by a suitable drive unit which is fastened outside the groove. By variable equipping of the tool with different cutting bodies or different tool shapes, machining zone surface roughness and the surface material-removal profile can be varied. The drive unit can be a speed-controllable motor which is positioned on the outside (above the groove).

For scanning the groove contour and milling out the cracks, a freely positionable device for five-axis movement or positioning is especially suitable, as is disclosed and described in detail in printed publication WO-A1-03/037562.

Figure 1:
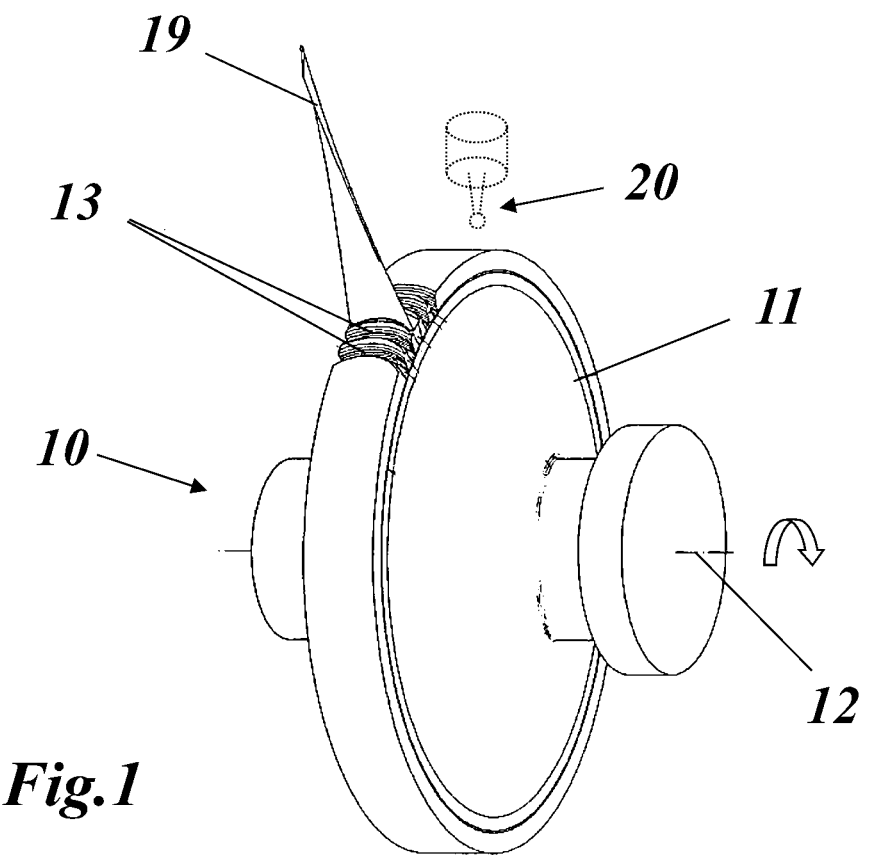
FIG. 1 shows an example of the rotor of a low-pressure steam turbine with a rotor blade which is inserted into one of the curved fir-tree grooves, which extend in the axial direction, in the rotor disk.
Figure 2:
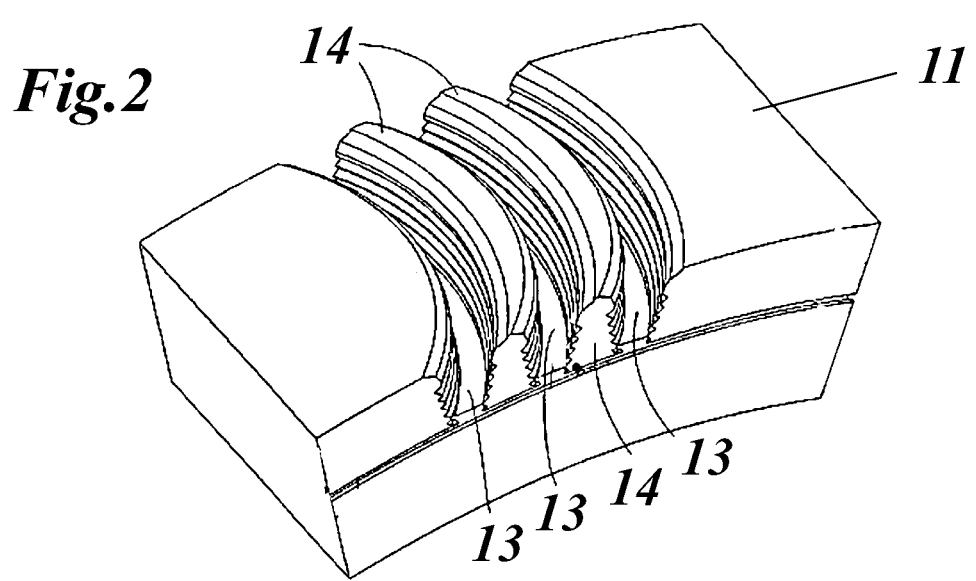
FIG. 2 shows, in an enlarged view, a plurality of the fir-tree grooves from FIG. 1 which are distributed uniformly over the circumference of the rotor disk.

In practice, a rotor of a low-pressure steam turbine, which is to be repaired on account of incipient cracks in the surface of the fir-tree groove, is fixed in a horizontally lying manner (see FIG. 1). A milling tool (20 in FIG. 1) is guided along the crack-flawed groove base of the fir-tree groove 13 and motor driven, wherein a material-removal process results on the contact surfaces between working tool and groove base as the surface which is to be machined. The milled-out groove flank surface, which is defined in contour and depth, is the aim of the material-removal process, wherein the surface depth which is to be milled out is predetermined by the crack depth which is determined before or during the material-removal process.

The milling tool 20 in this case machines a groove surface which is defined by the spatial movement of the milling tool positioning device 17 along the groove.

In order to free all grooves which are flawed with cracks by material removal by machining of such grooves, a repositioning in steps of the setting of rotor 10 and milling tool 20 is advantageously carried out by a faceplate with increments which drives the rotor shaft.

Figure 5:
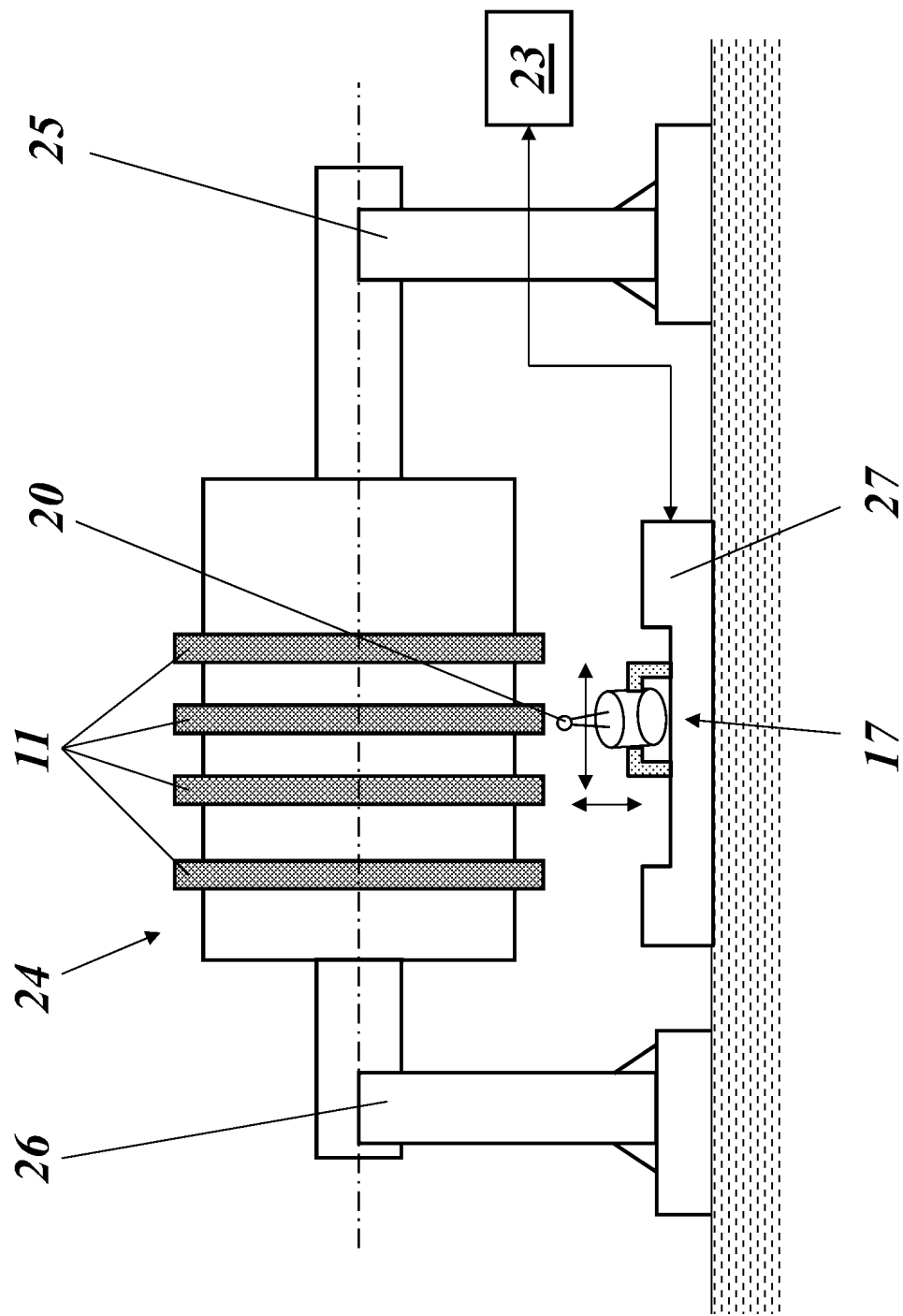
FIG. 5 shows, in a greatly schematized view, a device for machining the crack-flawed grooves from the bottom or from the side, according to an exemplary embodiment of the invention.

Methods according to the invention can be carried out especially simply and with considerably reduced cost and also, if necessary, directly at the operating site of the rotor, if a configuration according to FIG. 5 is used. The rotor 24 in this case is jacked up horizontally above the ground onto two pedestals 25 and 26 so that the rotor disks 11, which are to be machined, with their blade grooves are completely accessible from the bottom or from the side. In the example of FIG. 5, a milling tool 27 is placed directly beneath or to the side of the rotatably mounted rotor 24. In the milling device 27, the milling tool 20, by a corresponding milling tool positioning device 17 which is controlled by the control unit 23, again has the capacity to machine the grooves on the rotor in the previously described manner. The milling device 27 is only schematically shown in FIG. 5 and in practice can be constructed in different ways.

Exemplary methods altogether can have the following characteristics:

For repair of crack-flawed fir-tree grooves on low-pressure steam turbine rotors, the crack-flawed fir-tree grooves are recut by a spatially freely movable milling facility in the region of the cracks, wherein the cracks as such are removed.

The groove contour in the transition of the groove flanks is variably formed in width and radii, being predetermined in each case by the shape of the milling tool.

Crack-susceptible groove shapes which were formerly introduced in rotors during the original manufacturing process can also be advantageously subsequently reconfigured into crack-resistant groove shapes by milling.

The motor-driven tool guide is preferably positioned beneath or next to the turbine shaft which is to be machined, which saves on conventional platforms or frames which are for positioning the operator or the machine. It is a prerequisite for the rotor mass to be sufficiently large to absorb the machining forces from the milling process without additional costly component securing.

LIST OF DESIGNATIONS 10, 24 Rotor (low-pressure turbine)
11 Rotor disk
12 Axis
13 Fir-tree groove
14 Tooth
15 Serration
16 Serration base
17 Milling tool positioning device
18 Probe
19 Blade
20 Milling tool
21 Crack
22 Cutting-out region
23 Control unit
25, 26 Pedestal
27 Milling device While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for machining a groove which is provided for accommodating a blade on a turbine rotor, the method comprising:

rotatably mounting the rotor with grooves horizontally onto two pedestals;

inspecting the groove for the presence of cracks;

running over the groove which is flawed with cracks with a probe, and determining a scanned groove contour from said running over;

matching a milling tool to a crack shape;

determining a depth of a region which is to be cut out for the removal of the crack;

positioning a freely movable program-controlled milling device underneath the rotatably mounted rotor, which is horizontally supported above the milling device on the two pedestals, the milling device having a milling tool and a milling tool positioning device;

inserting the program-controlled milling device into the groove from beneath the rotatably mounted rotor;

guiding the milling tool along places in the groove which are to be machined; and removing material in the grooves with the milling device, including milling down the region which includes the crack to said depth with said milling tool in accordance with the scanned groove contour and wherein forces from said milling are absorbed by a mass of the rotor without additional component securing.

2. The method as claimed in claim 1, wherein said removing material is performed until the shape of the entire groove is altered so that it is less susceptible to cracks compared with the unaltered shape of the groove.

3. The method as claimed in claim 1, wherein running over the groove which is flawed with cracks comprises moving the probe with the milling tool positioning device.

4. The method as claimed in claim 1, wherein milling down comprises guiding the milling tool along a previously programmed groove track contour without altering the overall shape of the groove.

5. The method as claimed in claim 1, wherein milling down comprises moving the milling tool with a drive unit which is arranged outside the groove.

6. The method as claimed in claim 1, wherein milling down comprises cutting out the region which includes the crack with a plurality of milling tools with different cutting bodies, different tool shapes, or both, one after the other.

7. The method as claimed in claim 5, wherein milling down comprises moving the milling tool in the groove in a plurality of planes in a programmed controllable manner.

8. The method as claimed in claim 1, further comprising:

horizontally mounting the rotor on bearings.

9. A method as claimed in claim 1, wherein the grooves comprise fir-tree grooves.

10. A method as claimed in claim 1, wherein the turbine rotor is a low-pressure steam turbine rotor.

11. The method as claimed in claim 1, comprising:

performing the method at an operating site of the turbine rotor.

* * * * *